United States Patent
Archer et al.

(10) Patent No.: US 11,526,852 B2
(45) Date of Patent: Dec. 13, 2022

(54) ENHANCED SPACE MANAGEMENT VIA MICRO-LOCATION TRACKING

(71) Applicant: Verizon Patent and Licensing Inc., Arlington, VA (US)

(72) Inventors: Steven T. Archer, Dallas, TX (US); Paul Brand, Coppell, TX (US); Matthew J. Threefoot, Columbia, MD (US); Thierry R. Sender, New York, NY (US); Pramod Kalyanasundaram, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1583 days.

(21) Appl. No.: 15/181,742

(22) Filed: Jun. 14, 2016

(65) Prior Publication Data

US 2017/0357948 A1   Dec. 14, 2017

(51) Int. Cl.
*G06Q 10/10*   (2012.01)
*H04W 4/021*   (2018.01)
*H04W 4/80*   (2018.01)

(52) U.S. Cl.
CPC ........ *G06Q 10/1095* (2013.01); *H04W 4/021* (2013.01); *H04W 4/80* (2018.02)

(58) Field of Classification Search
CPC .......................... G06Q 10/1095; H04W 4/021
USPC ..................................................... 705/7.19
See application file for complete search history.

(56) References Cited

U.S. PATENT DOCUMENTS

| | | | | |
|---|---|---|---|---|
| 9,955,318 | B1* | 4/2018 | Scheper | H04W 4/30 |
| 2005/0185618 | A1* | 8/2005 | Friday | H04B 17/27 |
| | | | | 709/239 |
| 2007/0139191 | A1* | 6/2007 | Quatro | G06Q 10/08 |
| | | | | 340/539.2 |
| 2007/0264969 | A1* | 11/2007 | Frank | H04W 4/029 |
| | | | | 455/404.2 |
| 2008/0195312 | A1* | 8/2008 | Aaron | G06Q 30/0201 |
| | | | | 455/418 |
| 2012/0059580 | A1* | 3/2012 | Coughlin | G06Q 10/109 |
| | | | | 701/465 |
| 2012/0158448 | A1* | 6/2012 | Perrella | G06Q 30/02 |
| | | | | 705/7.19 |
| 2012/0197670 | A1* | 8/2012 | Poon | G06Q 10/02 |
| | | | | 705/5 |
| 2013/0267171 | A1* | 10/2013 | Sarkar | G06Q 10/00 |
| | | | | 455/41.1 |

(Continued)

*Primary Examiner* — Renae Feacher

(57) ABSTRACT

A system dynamically assigns spaces to users. The system acquires scheduling information for users and identified times when one of the spaces should be assigned to a group of the users (e.g., when a meeting is scheduled). The system may select the space based on the size of the group. The users wear smart identifier (ID) badges that transmit short-range communications signals. A detector detects the signals and may forward a notification to the system identifying the users' locations. The system dynamically re-assigns the space to different users if more than a threshold portion of the group members are, based on the determined locations, not expected to reach the reserved space at the scheduled time. The system assigns a different space to the group that is closer to the determined locations and/or more appropriately sized for the number of available group members.

20 Claims, 8 Drawing Sheets

(56) References Cited

U.S. PATENT DOCUMENTS

| | | | | |
|---|---|---|---|---|
| 2014/0058778 A1* | 2/2014 | McLarty | H04B 7/0857 | 705/7.19 |
| 2014/0108084 A1* | 4/2014 | Bargetzi | G06Q 10/1095 | 705/7.19 |
| 2014/0188541 A1* | 7/2014 | Goldsmith | G06Q 10/06 | 705/7.19 |
| 2014/0330904 A1* | 11/2014 | Jackson | H04L 67/18 | 709/204 |
| 2015/0142895 A1* | 5/2015 | Beran | H04L 51/04 | 709/206 |
| 2016/0102879 A1* | 4/2016 | Guest | F24F 11/30 | 700/276 |
| 2016/0127856 A1* | 5/2016 | Link, II | H04W 4/02 | 455/41.2 |
| 2016/0255466 A1* | 9/2016 | Shuster | G06Q 10/1093 | 455/414.3 |
| 2016/0300160 A1* | 10/2016 | Klein | H04W 8/005 | |
| 2017/0019488 A1* | 1/2017 | Memon | H04L 67/18 | |
| 2017/0124366 A1* | 5/2017 | Good | H04W 4/02 | |
| 2017/0357948 A1* | 12/2017 | Archer | H04W 4/80 | |

\* cited by examiner

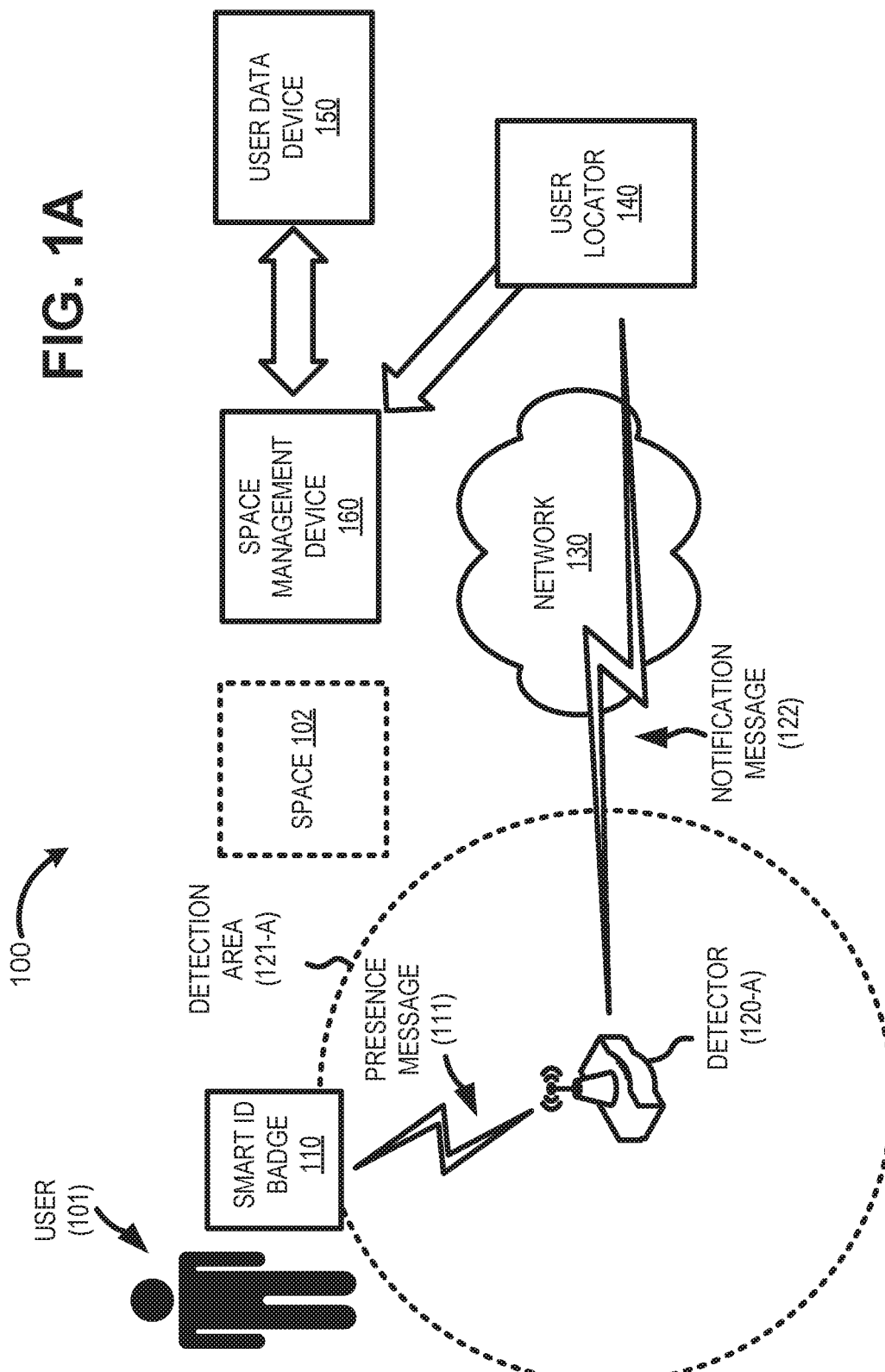

FIG. 3

| SMART ID BADGE IDENTIFIER 310 | USER IDENTIFIER 320 | CURRENT LOCATION 330 | PRIOR LOCATION 340 | MEETING DATA 350 | OTHER DATA 360 | SPACE ASSIGNMENT DATA 370 |
|---|---|---|---|---|---|---|
| MAC ADDRESS 1 | USER NAME 1 | LOCATION 1 | PRIOR LOCATION 1 | MEETING DATA 1 | OTHER DATA 1 | SPACE ASSIGNMENT DATA 1 |
| ... | ... | ... | ... | ... | ... | ... |
| MAC ADDRESS N | USER NAME N | LOCATION N | PRIOR LOCATION N | MEETING DATA N | OTHER DATA N | SPACE ASSIGNMENT DATA N |

LOCATION DATA 301 [FROM USER LOCATOR 140]

SCHEDULING DATA 302 [FROM USER DATA DEVICE 150]

300

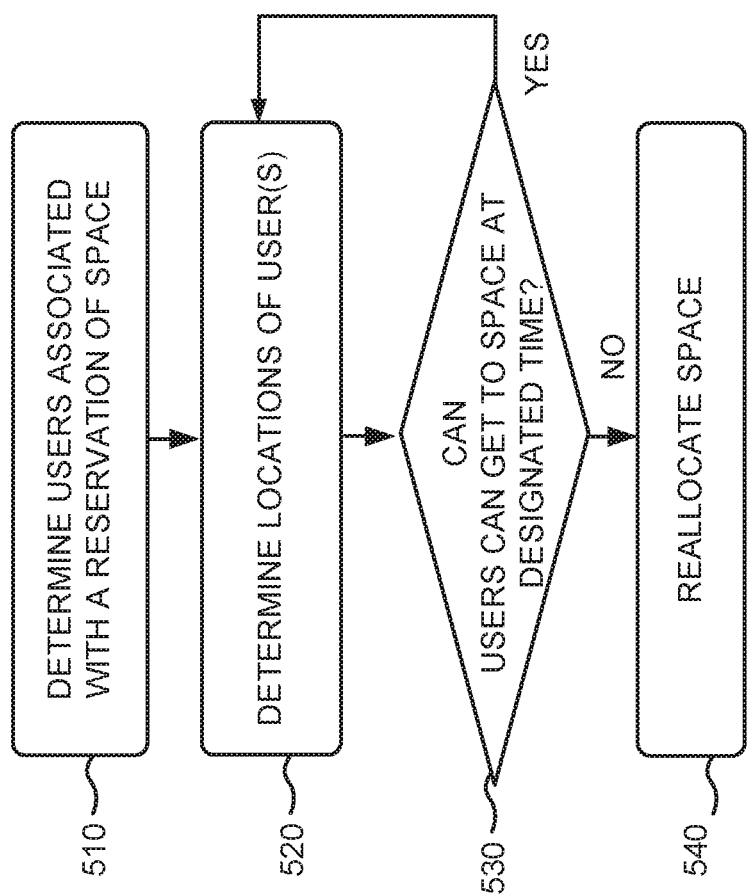

ably. Presence message 111 may include, for example, a "beacon frame" associated with the connection request.

In one implementation, smart ID badge 110 may transmit presence message 111 passively (e.g., without a request from detector 120). For example, if smart ID badge 110 supports Bluetooth® communications, smart ID badge 110 may transmit, as presence message 111, a connection request when smart ID badge 110 is operating in a visible (or discoverable) mode. In another implementation, smart ID badge 110 may send presence message 111 in response to a message received from detector 120. For example, if detector 120 is included in or associated with a femtocell that transmits an offer for short-range data and/or communication services, presence message 111 may be associated with a response to the offer, such as a request to connect to the femtocell associated with detector 120.

Presence message 111 may include, for example, data identifying user 101 and/or an identifier associated with smart ID badge 110, such as a serial number, a network address, a media access control (MAC) address associated with smart ID badge 110, etc. A MAC address is a unique identifier assigned to a network interface for communications on a physical network segment (e.g., a Bluetooth® wireless interface) between smart ID badge 110 and detector 120. The MAC addresses may be used as a network address (e.g., in the media access control protocol sublayer of the open systems interconnection (OSI) model) for smart ID badge 110 in various types of communication, including a WPAN or other IEEE 802 network technologies such as Ethernet. Smart ID badge 110 may be associated with multiple MAC addresses, such as separate MAC addresses for different types of communication protocols, such as a first MAC address (e.g., 48 bit address based on a MAC-48 protocol) for Bluetooth® communications and a second, different MAC address (e.g., an extended unique identifier, or EUI, 48 bit or 64 bit address) for data exchanges via a wireless wide area network (WWAN), such as long term evolution (LTE), 4G, 3G, or another wireless data protocol.

In certain examples, smart ID badge 110 may include a sensor to detect an environmental condition associated with user 101 during a given time period, and smart ID badge 110 may include, in presence message 111, information identifying the detected environmental condition. For example, smart ID badge 110 may include a microphone to collect audio data, a camera to detect visual data, a thermometer to temperature data, a hygrometer to detect ambient humidity levels, a location detector (e.g., a receiver to detect a global position system signal) to determine a geographic location associated with user 101, etc.

Detector 120 may receive presence message 111 when smart ID badge 110 is located within detection area 121. Detection area 121 may correspond to a geographic region in which detector 120 is able to detect presence message 111 transmitted from smart ID badge 110. In the implementation shown in FIGS. 1A-1C, detector 120-A may include a non-directional antenna (or other receiving device) to detect presence message 111 when detector 120 is within transmission range of smart ID badge 110. For example, if presence message 111 corresponds to a Bluetooth® connection request or other Bluetooth® communication, detector 120 may typically detect presence message 111 if smart ID badge 110 is located within 25 to 50 meters of detector 120. As shown in FIGS. 1A-1C, detection area 121-A may be substantially circular to reflect that detector 120 may receive presence message 111 in most directions within a transmission range associated with smart ID badge 110 for presence message 111.

ENHANCED SPACE MANAGEMENT VIA MICRO-LOCATION TRACKING

BACKGROUND INFORMATION

Many businesses and organizations may allocate limited physical spaces among different users. For example, a school may schedule various classes and activities within a classroom during different time periods. Inefficient space allocation may lead to significant social and economic costs. For example, if a space is allocated to a user during a time period and the user subsequently becomes unavailable during the time period, the space will be unused even though other users could have used the space. In another example, inefficient allocation of a large space to a relatively small group causes the large space to be unavailable for use by a larger group. Furthermore, inefficient space allocation may lead to unnecessary energy consumption for maintaining environmental conditions (e.g., heating an unused or under-utilized space).

BRIEF DESCRIPTION OF THE DRAWINGS

FIGS. 1A-1D are a diagrams illustrating an exemplary environment according to implementations described herein;

FIG. 3 shows a exemplary table storing data that may be collected and stored within the environment of FIGS. 1A-1D;

FIG. 5 is a flowchart of a process for managing spaces based on the location of users in the environment of FIGS. 1A-1D.

DETAILED DESCRIPTION OF PREFERRED EMBODIMENTS

Figure 1B:
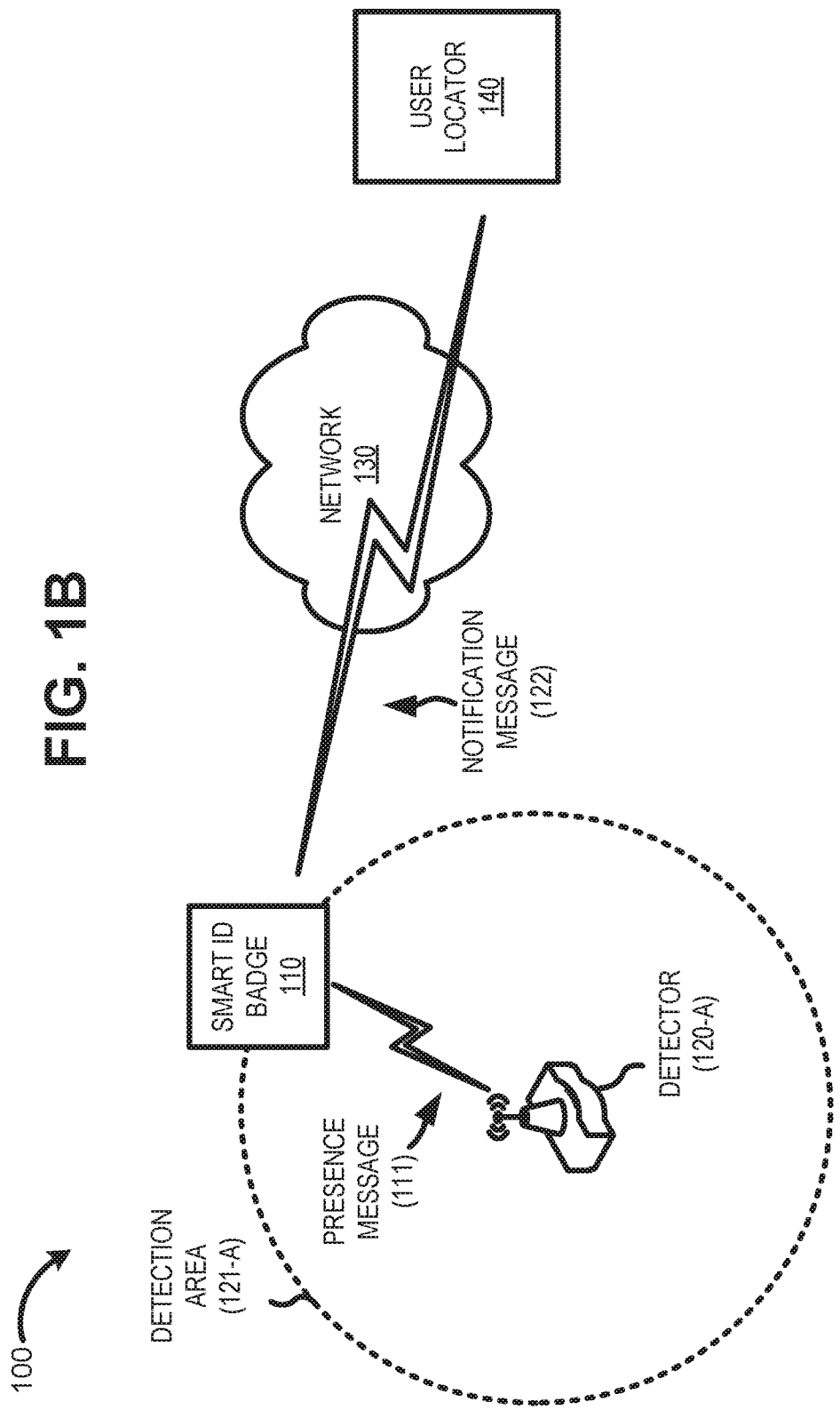

The following detailed description refers to the accompanying drawings. The same reference numbers in different drawings identify the same or similar elements.

FIGS. 1A-1D are diagrams showing an exemplary environment 100 in which the systems and/or methods, described herein, may be implemented. In the example shown in FIG. 1A, environment 100 may include a smart identification (ID) badge 110 associated with a user 101, a detector 120 (shown in FIG. 1A as detector 120-A), a network 130, a user locator 140, a user data device 150, and space management device 160 for managing a space 102.

Smart ID badge 110 may correspond to an internet of things (IoT) device that includes a transmitter (e.g., an antenna) to exchange a presence message 111 with detector 120 when smart ID badge 110 is positioned within a detection area 121 (shown in FIGS. 1A-1C as detection area 121-A and in FIG. 1D as detection area 121-B) associated with detector 120. For example, smart ID badge 110 may correspond to a wearable object that includes components to transmit presence message 111. Smart ID badge 110 may send a presence message 111 via a short-range communications protocol, such as Bluetooth®, Wi-Fi®, or IrDA, and detection area 121 may correspond to a range associated with smart ID badge 110 and detector 120-A. Detector 120 may correspond to a WiFi router (e.g., a hotspot), and presence message 111 may correspond to a WiFi connection After receiving presence message 111, detector 120 may parse presence message 111 to extract data identifying smart ID badge 110. For example, detector 120 may parse presence message 111 to determine a user identifier, a MAC address, or other device identifier associated with smart ID badge 110. In another implementation, detector 120 may use the data included in presence message 111 to establish communications with smart ID badge 110 or other another device (e.g., user device 170 shown in FIG. 1C) to obtain information regarding smart ID badge 110 and/or user 101. For example, detector 120 may use authentication data, session data, etc. included in presence message 111 to communicate with a user device 170, to obtain the user identifier, to identify a location (e.g., a global positioning system value), etc. associated with smart ID badge 110. If smart ID badge 110 includes a sensor and puts collected sensor data within presence message 111, detector 120 may further parse presence message 111 to extract the sensor data.

Additionally or alternatively, detector 120 may detect and analyze a characteristic associated with presence message 111. For example, detector 120 may identify a change in an attribute of presence message 111 after transmission from smart ID badge 110. For example, detector 120 may identify a frequency shift, a transmission delay, a received portion of presence message 111, etc. In another example, detector 120 may measure a received signal strength of presence message 111. For example, detector 120 may determine a received signal strength indicator (RSSI) value and/or a received channel power indicator (RCPI) value, as defined in IEEE standard 802.11 for wireless local area networks (WLANs).

As shown in FIG. 1A, detector 120 may form a notification message 122 and may forward notification message 122 to user locator 140 via network 130. Notification message 122 may include data identifying a location and/or other information associated with detector 120. Detector 120 may also include, in notification message 122, information extracted from presence message 111, such as an identifier for user 101 and/or smart ID badge 110. For example, if presence message 111 corresponds to a Bluetooth® connection request or other Bluetooth® communication, detector 120 may include a MAC address associated with smart ID badge 110. Detector 120 may further include, in notification message 122, data regarding a detected attribute of presence message 111, such as a received signal strength, frequency, etc.

In one implementation, detector 120 may correspond to an access point for accessing communications and/or data services. For example, detector 120 may be configured to use IEEE 802.11 standards for implementing a wireless local area network (LAN) with smart ID badge 110. For example, detector 120 may enable user device 170 to access the voice and/or data services, such as to communicate with another device. In another implementation, detector 120 may be included in or is associated with a base station that enables a wireless device, such as smart ID badge 110 and/or user device 170, to communicate via network 130. For example, detector 120 may be included in an LTE eNodeB base station, a Global System for Mobile Communications (GSM) base station, a Code Division Multiple Access (CDMA) base station, and/or another type of base station.

Detector 120 may forward notification message 122 to user locator 140 via network 130. Network 130 may include one or more circuit-switched networks and/or packet-switched networks. For example, network 130 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

User locator 140 may process notification message 122 to identify a geographic location of smart ID badge 110. For example, user locator 140 may store information identifying locations of different detectors 120, and user locator 140 may associate smart ID badge 110 (and user 101) with a location of a given detector 120 forwarding notification message 122 (e.g., detector 120 receiving presence message 111).

In another example, User locator 140 may use the attributes of presence message 111 to identify a location of smart ID badge 110 (and therefore a location of user 101) relative to detector 120. As previously described, notification message 122 may include information regarding one or more attributes of presence message 111 (e.g., a signal attenuation, a received wavelength, a transmission delay, etc.). For instance, user locator 140 may determine a distance of smart ID badge 110 from detector 120 based on a transmission delay (e.g., an amount of time between transmission of presence message 111 by smart ID badge 110 and receipt of presence message 111 by detector 120). In another example, user locator 140 may determine a distance of smart ID badge 110 from detector 120 based on signal attenuation corresponding to a decrease in a signal strength of presence message 111 between smart ID badge 110 and detector 120. In yet another example, user locator 140 may determine a direction that smart ID badge 110 is moving relative to detector 120 based on a change in the frequency associated with presence message 111 after transmission by smart ID badge 110.

User locator 140 may further compare locations of smart ID badge 110 over two or more time periods (e.g., a current location and a prior location) to identify a movement pattern of smart ID badge 110. For example, user locator 140 may identify a movement direction and movement rate associated with smart ID badge 110. Additionally, user locator 140 may use the movement pattern to predict a future location of smart ID badge 110 (e.g., a location for smart ID badge 110 if the movement direction and rate detected during a current time period continues during a future time period). In another example, user locator 140 may identify a known movement pattern associated with smart ID badge 110 (e.g., a movement pattern during a prior time period), and user locator 140 may use this known movement pattern to predict a future location for smart ID badge 110. For example, user locator 140 may predict a movement of smart ID badge 110 from a currently detected location based on previously detected movements of smart ID badge 110.

In one implementation, environment 100 may include multiple detectors 120, and user locator 140 may identify a movement pattern of smart ID badge 110 based on presence messages 111 received from the different detectors 120. For example, user locator 140 may determine that smart ID badge 110 is moving from a detection area 121 associated with a detector 120 to another detection area 121 associated with another detector 120 based on presence messages received from the detectors 120. For instance, if a presence message 122 is received from a first detector 120 during a time period, and another presence message 122 is received from a second, different detector 120 during a subsequent time period from the same smart ID badge 110, user locator 140 may determine that smart ID badge 110 is moving away from the first detector 120 and toward the second detector 120.

As shown in FIG. 1A, environment 100 may further include user data device 150. User data device 150 may interact with one or more other devices, such as user device 170, a backend device (not shown in FIG. 1A), etc. to collect data regarding the activities user 101. User data device 150 may interface with or include typical, point solutions, business tools and services, etc. that are used to manage interaction of user 101 and space 102. These systems may include meeting room schedulers, building access systems, a human resource (HR)/employee database and directory service, asset management, voice/video schedulers, and network access, etc. These systems may work independently of each other with no knowledge of user 101's real time location. For example, user data device 150 may interact with a calendar application associated with user 101 to identify an expected activity to be performed by user 101. Additionally, user data device 150 may interact with a scheduling application to identify an expected location associated with the activity.

As shown in FIG. 1A, system 100 may further include space management device 160. Space management device 160 may interact with user locator 140 to determine a geographic location associated with user 101 and/or user data device 150 to determine other information regarding user 101 (e.g., calendar information). Space management device 160 may further use the information collected from user locator 140 and/or user data device 150 to manage access to space 102 by user 101.

For example, space management device 160 may acquire positioning information and understand how user 101 moves throughout the day. Space management device 160 may learn a pattern of movement of user 101 and build a logic model for the movement of user 101. For example, space management device 160 may use the real-time location data of user 101 and other data to identify movement and tasks of user 101 and predict how user 101 is going to use space 102. In one example, space management device 160 may provide information regarding the scheduling of space 102 to user data device 150. For example, space management device 160 may update calendar information associated with user 101 to indicate when space 102 is scheduled for use by user 101 and/or when space 102 is reassigned to another user 101.

Space management device 160 may use information from user data device 150 to determine that user 101 desires access to space 102. For example, space management device 160 may determine, based on data from user data device 150, that user 101 is scheduled to meet with one or more other users 101 (not shown in FIG. 1A). The space management device 160 may use data from user locator 140 to select one of multiple spaces 102 to assign to user 101 based on a detected geographic location associated with user 101. For example, space management device 160 may identify a subset of spaces 102 that are reachable by user 101 (and/or other people participating in the meeting) during a given time period in view of a movement pattern, pace, etc. associated with user 101, as determined by user locator 140. In certain instances, when selecting one of the spaces 102 to assign to user 101, space management device 160 may identify a space 102 previously used otherwise preferred by user 101.

In one example, space management device 160 may identify another user 101 that may be meeting with or otherwise sharing space 102. For example, space management device 160 may interact with user data device 150 to identify other users 101 scheduled to meet with user 101 during a given time period. Space management device 160 may identify, based on data from user data device 150, a number of users 101 expected to meet, and space management device 160 may select a particular space 102 from several available spaces 102 based on the number of expected users 102. For example, space management device 160 may assign a first space 102 to a group when the group includes less than a threshold number of users 101, and space management device 160 may assign a second, larger space 102 to the users when the group includes more than the threshold number of users 101.

After assigning space 102 to user 101, space management device 160 may forward a notification to the identified users 101 meeting in the assigned space. For instance, space management device 160 may obtain contact information (e.g., an e-mail address, telephone number, MAC address for user device 170, etc.) for the identified users 101 from user data device 150, and space management device 160 may use the obtained contact information to notify users 101 of the assignment of space 102. The notification may identify space 102, meeting time when space is reserved, other users 101 invited to the meeting, etc. Space management device 160 may further include, in the notification to a given user 101, directions to space 102 from a determined location associated with that user 101. Additionally, the notification may include an estimated travel time (e.g., an amount of time that it would take user 101 to walk to space 1020) based on a detected movement rate associated with user 101, a direction being travelled by user 101, expected stops based on a prior movement pattern for user 101, etc.

In another example, space management device 160 may also establish communications (e.g., forward a reminder message) to a participant (e.g., another user 101) who is located too far to reach space 102 at a designated meeting time, given a determined movement pattern for the other user 101. If user 101 is late, space management device 160 may notify others in the meeting that user 101 is in route to space 102. Space management device 160 may further identify an expected arrival time of user 101 to space 102 based on a movement pattern associated with user 101.

In another example shown in FIG. 1B, smart ID badge 110 may forward notification message 122 to user locator 140 based on detecting presence message 111 sent from detector 120. For example, detector 120 may forward presence message 111 that corresponds to a WiFi and/or Bluetooth® connection request. Smart ID badge 110 may include a sensor to detect or forward presence message 111 when smart ID badge 110 is within transmission range of detector 120 (e.g., within detection area 121). Smart ID badge 110 may further include a transmitter or other output mechanism to forward notification message 122 to user locator 140 via network 130. For example, smart ID badge 110 may send notification message 122 using machine-to-machine (M2M) communications. Notification message 122 from smart ID badge 110 may include, for example, data identifying detector 120 sensed by smart ID badge 110.

Notification message 122 from smart ID badge 110 may also include, for example, data collecting by a sensor included in smart ID badge 110 or other devices associated with user 101. For example, smart ID badge 110 may include a biometric sensor that identifies physical attributes of user 101 (e.g., a heart-rate, body temperature, respiration rate, etc.), and this information may be included in notification message 122. User locator 140 may use this information to identify an activity associated with user 101 (e.g., whether user 101 is running) and use this information to predict a movement pattern associated with user 101. In another example, smart ID badge 110 may include sensors to detect environmental conditions (e.g., ambient light levels, air pressure, temperature, sound levels, etc.), and user locator 140 may use this information to identify a location associated with user 101. For instance, user locator 140 may associate smart ID badge 110 with a location of another sensor reporting similar environmental conditions.

Figure 1C:
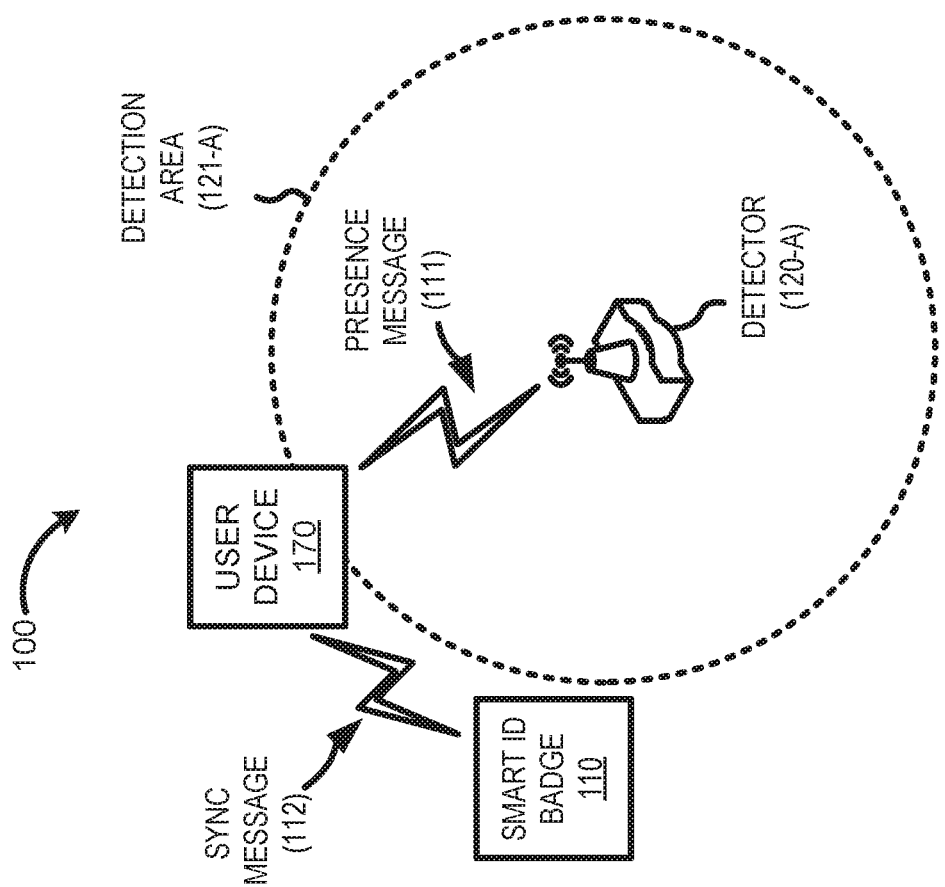

In another example shown in FIG. 1C, smart ID badge 110 may exchange a sync message 112 with a user device 170. For example, smart ID badge 110 and user device 170 may exchange sync message 112 to pair using Bluetooth® or other short-range, wireless communications protocol. When paired, smart ID badge 110 and user device 170 may exchange, as sync message 112, encrypted control or other data. Typically, the pairing process is triggered either by a specific request from user 101 to generate a bond or it is triggered automatically when smart ID badge 110 is in proximity of user device 170.

As used herein, user device 170 may be capable of exchanging presence message 111. For example, user device 170 may include a portable communication device (e.g., a mobile phone, a smart phone, a phablet device, a global positioning system (GPS) device, and/or another type of wireless device); a laptop, tablet, or another type of portable computer; a media playing device; a portable gaming system; and/or any other type of mobile computer device with communication and output capabilities.

Figure 1D:
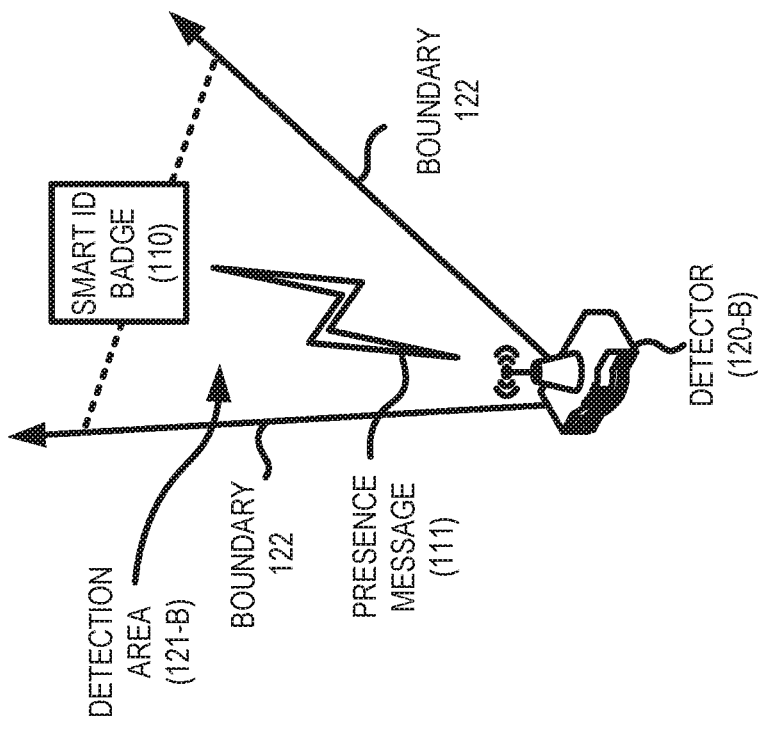

In another implementation shown in FIG. 1D, detector 120-B may include a directional antenna (e.g., detector 120-B is associated with a non-round detection area 121-B). For example, detector 120-B may include an antenna with a parabolic or other shaped reflector element that enables and/or improves the ability of detector 120 to receive presence message 111 in a first direction but not in a second, opposite direction. In the example, shown in FIG. 1D, detection area 121-B may include a region between boundaries 122 and that are within the communication range for presence message 111. For example, if detector 120-B is positioned near an entrance to a geographic region (e.g., space 102), detector 120-B may receive presence message 111 when smart ID badge 110 is near the entrance, but not after smart ID badge 110 has passed through the entrance and is within the geographic region.

Although FIGS. 1A-1D show exemplary components of environment 100, in other implementations, environment 100 may include fewer components, different components, differently arranged components, or additional components than depicted in FIGS. 1A and 1C. For example, user locator 140 is shown in FIG. 1A as being remotely accessed by detector 120 via network 130 (e.g., user locator 140 may be a cloud-based service), but user locator 140 may be positioned proximate to smart ID badge 110 and/or detector 120. Additionally or alternatively, one or more components of environment 100 may perform functions described as being performed by one or more other components of environment 100.

Figure 2:
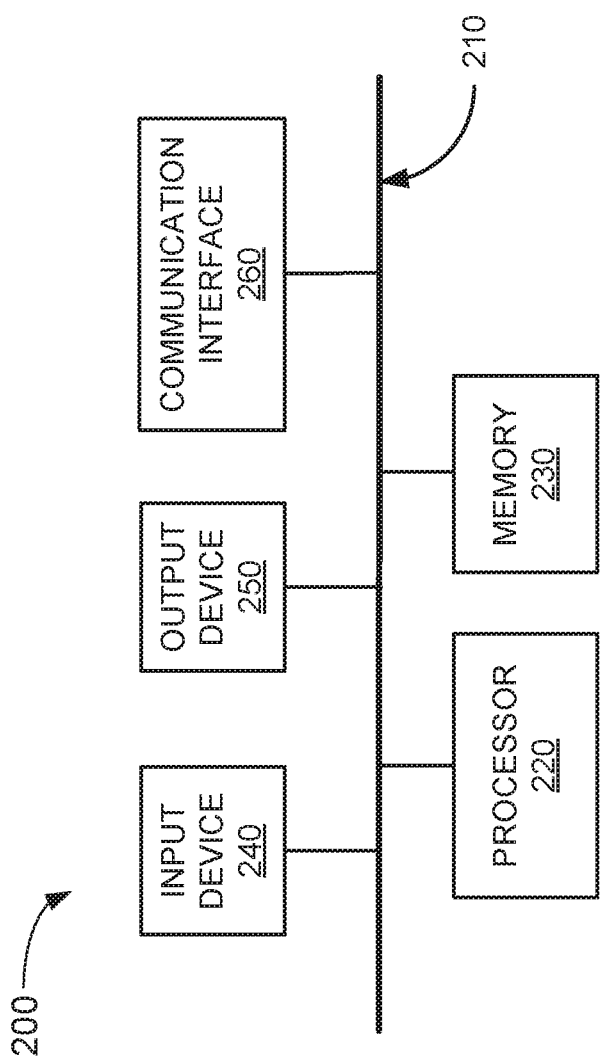
FIG. 2 is a diagram illustrating exemplary components of a device that may be included in the environment of FIGS. 1A-1D.

FIG. 2 is a diagram illustrating exemplary functional components of device 200 according to an implementation described herein. Smart ID badge 110, detector 120, a component of network 130, user locator 140, user data device 150, space management device 160, and user device 170 may each include one or more devices 200. As shown in FIG. 2, device 200 may include a bus 210, a processor 220, a memory 230, an input unit 240, an output unit 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 240 may allow an operator to input information into device 200. Input unit 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input unit 240. In other words, device 200 may be "headless" and may not include a keyboard, for example.

Output unit 250 may output information to an operator of device 200. Output unit 250 may include a display, a printer, a speaker, and/or another type of output device. For example, device 200 may include a display, which may include a liquid-crystal display (LCD) for displaying content to the customer. In some embodiments, device 200 may be managed remotely and may not include output unit 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, device 200 may perform certain operations relating to modification of search and advertisement selection for a second screen device, associated with a video asset being streamed to a first screen device. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. For example, smart ID badge 110 may correspond to an IoT device that may exclude devices 240 and output device 250. Additionally or alternatively, one or more components of device 200 may perform one or more tasks described as being performed by one or more other components of device 200.

FIG. 3 shows an exemplary table 300 generated by space management device 160 in one implementation. As shown in FIG. 3, table 300 may include location data 301 collected from user locator 140 and scheduling data 302 collected from user data device 150. More specifically, table 300 may include, for example, a smart ID badge identifier column 310, a user identifier column 320, a current location column 330, a prior location column 340, a meeting data column 350, an other data column 360, and/or a space assignment data column 370. In table 300, data included in entries in a row may be associated with a same smart ID badge 110 (e.g., user name 1, current location 1, prior location 1, preference data 1, meeting data 1 and other data 1 may be associated with a given smart ID badge 110 associated with MAC address 1).

Smart ID badge identifier column 310 may store information identifying smart ID badge 110, such as the MAC address, serial number, etc. User identifier column 320 to store information, such as a name, employee number, etc., identifying a user associated with smart ID badge 110 (e.g., user 101 wearing smart ID badge 110). In one implementation, user locator 140 may receive notification message 122 indicating the smart ID badge 110 is detected at a location associated with detector 120.

Space manager device 160 may use a smart ID badge identifier (e.g., a MAC address for smart ID badge 110 stored in column 310) to access table 300 and identify an associated user 101 (e.g., based on data stored in user identifier column 320). Space manager device 160 may interface with user locator 140 to identify a current location (stored in current location column 330) and a prior location (stored in prior location column 340). Space management device 160 may compare data in current location column 330 and prior location column 340 to identify a movement pattern (e.g., movement direction, movement pace, etc.) associated with the identified user 101. Space manager device 160 may store data identifying the determined movement pattern in table 300 (e.g., in other data column 360 or another column that is not depicted in FIG. 3.

As shown in FIG. 3, space manager device 160 may collect, from user data device 150, data in meeting data column 350 identifying meetings scheduled for user 101. Other data 360 may also identify other information associated with a scheduled meeting, such as identifying other users invited to a meeting, contact information for the other users, information identifying a meeting type, equipment needed for a meeting, etc.

As further shown in FIG. 3, space manager device 160 may generate data in space assignment data column 370 identifying spaces 102 assigned to certain users 101 at certain times. For example, space manager device 160 may determine times (e.g., based on meetings identified in meeting data column 350) when one of multiple spaces 102 is needed by a user 101. Space manager device 160 may identify a subset of the multiple space 102 that are reachable by user 101 during a time period associated with a meeting (e.g., a space 102 that is within a threshold distance of a current location for user 101, as identified in current location column 330). The threshold distance may be a fixed distance or may be identified for user 101 based on a movement pattern (e.g., a movement rate) for user 101. Additionally or alternatively, space manager device 160 may allocate space 102 based on attributes of the meeting, such as an expected number of participants in the meeting, equipment needed for the meeting, locations of the intended participants, etc. For example, manager device 160 may allocate a given space 102 that is within a threshold distance of expected geographic locations associated with invited users 101.

As used herein, assigning (or reserving) a space 102 to a user 101 may include storing (e.g., in space assignment data column 370) data associating the space 102 with the user 101 during a given time period. Furthermore, storing data (e.g., in space assignment data column 370) data associating the space 102 with the user 101 during the given time period may prevent data associating the space 102 with a different user 101 during the given time period. For example, logical rules implemented by space management device 160 may prevent data assigning the same space 102 from being assigned to different users 101 during a same time period absent additional information (e.g., the different users 101 are meeting during that time).

As used herein, reassigning (or modifying a reservation) of space 102 to user 101 during the time period may include removing (e.g., in space assignment data column 370) data associating the space 102 with the user 101 and/or replacing this data with new data associating space 102 with a different user 101 and/or associating user 101 with a different space 101.

If updated location data from user locator 140 indicates that user 101 will likely not reach space 102 by an assigned meeting time (e.g., user 101 is expected to arrive at an assigned space 102 after an assigned time if user 101 continues to travel at an observed pace from a currently detected location), space manager device 160 may update space assignment data column 370 to reassign space 102 to another user 101 and/or to assign a different space 102 to user 101. For example, space manager device 160 may assign, to user 101, a different space 102 that is closer to a current location (as stored in current location column 330) associated with user 101. Space manager device 160 may forward a notification of the reassignment of space 102 to smart ID badge 110 (e.g., using a MAC address identified in smart ID badge identifier column 310).

In another example, other data column 360 may identify the user's preferred room type and/or environmental conditions, such as a desired room temperature, light levels, music stations, etc. Space manager device 160 may forward data to devices (e.g., IoT devices) in reserved space 102 to direct the other devices to perform actions (e.g., activate environmental controls) to achieve the desired conditions. In another example, space manager device 160 may forward information that enables user 101 to enter space 102 at/during an assigned time. For example, space manager device 160 may program a locking mechanism to open when smart ID badge 110 approaches the locking mechanism (e.g., when a detector 120 near the locking mechanism detects presence message 111 from smart ID badge 110).

Although FIG. 3 shows exemplary data that may be included in table 300, in other implementations, table 300200 may include fewer data, different data, additional data, or differently arranged data than those depicted in FIG. 3. Additionally or alternatively, one or more portions of table 300 may store data described as being stored in another portion of table 300.

Figure 4:
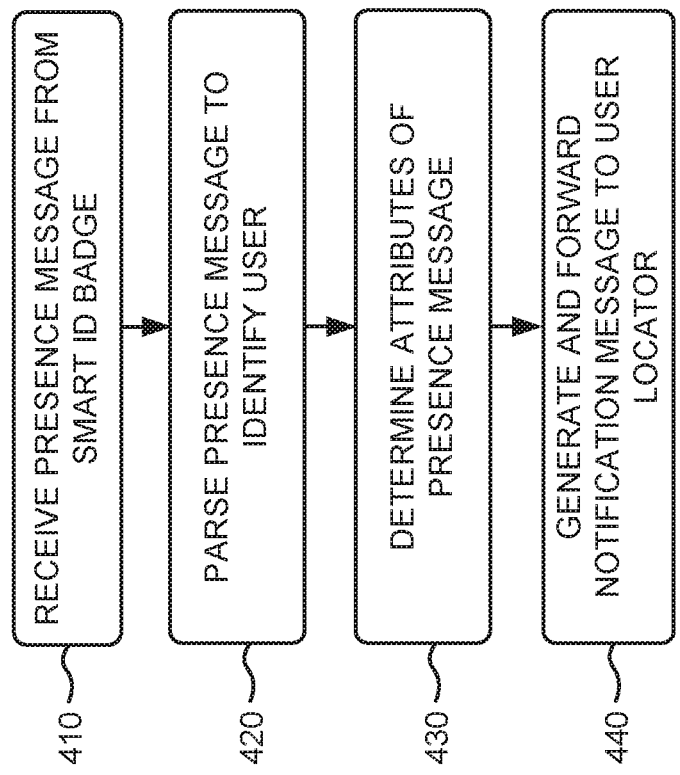
FIG. 4 is a flowchart of a process for determining locations of users in the environment of FIGS. 1A-1D.

FIG. 4 is a flowchart of a process 400 of generating notification message 122 according to an implementation described herein. In some implementations, process 400 may be performed by detector 120. In other implementations, some or all of process 400 may be performed by another device or a group of devices separate from and/or including detector 120.

Process 400 may include receiving presence message 111 (block 410). For example, detector 120 may receive presence message 111 when smart ID badge 110 is located within a detection area 121 that corresponds to a geographic region in which detector 120 is able to detect presence message 111 transmitted from smart ID badge 110.

As shown in FIG. 4, process 400 may include parsing presence message 111 to obtain information regarding smart ID badge 110 (block 420). For example, detector 120 may parse presence message 111 (e.g., as received by presence message reception unit 410) to extract data identifying smart ID badge 110. For example, detector 120 may parse presence message 111 to determine the MAC address or other device identifier, a device type, manufacturer, model, serial number, etc. associated with smart ID badge 110.

As shown in FIG. 4, process 400 may further include determining attributes of presence message 111 (block 430). For example, detector 120 may determine physical characteristics associated with presence message 111. For example, detector 120 may identify a frequency, a received signal strength, etc. a received presence message 111.

Continuing with FIG. 4, process 400 may further include generating notification message 122 and forwarding notification message 122 to user locator 140 (block 440). For example detector 120 may forward notification message 122 to user locator 140 via network 130. Notification message 122 may include data identifying a location and/or other information associated with detector 120. Notification message 122 may also include information extracted from presence message 111. Detector 120 may further include, in notification message 122, data regarding detected attributes of a received version of presence message 111, such as a received signal strength, frequency, etc.

FIG. 5 is a flowchart of a process 500 for managing a space 102. In some implementations, process 500 may be performed by space management device 160. In other implementations, some or all of process 500 may be performed by another device or a group of devices separate from and/or including space management device 160.

As shown in FIG. 5, process 500 may include determining one or more users 101 associated with a reservation of space 102 (block 510). For example, space management device 160 may store (e.g., in table 300) data identifying a given user 101 who requested access to space 102 at a given time. Space management device 160 may further interface with user data device 150 to identify users 101 expected to use space 102 at the given time. For example, space management device 160 may review meeting invitations from the given user 101 to identify the other users 101. In another example, space management device 160 may review calendar/scheduling data to identify users 101 meeting at space 102 at a given time. In yet another example, space management device 160 may interface with user data device 150 to identify members of team or group, associated with the given user 101 and who are likely to meet together at the given time. For instance, space management device 160 may identify other users 101 that tend to meet with the given user 101 at the meeting time.

As shown in FIG. 5, process 500 may include determining locations of the identified users (block 520). For example, space management device 160 may interface with user locator 140 to identify geographic locations of smart ID badges 110 associated with the users 101. In another example, space management device 160 may collect information regarding sensor data collected in space 102 and may determine whether a user 101 is located in space 102 based on the collected sensor data. For example, space management device 160 may determine that a user 101 is present in a space 102 if (1) a security mechanism to space 102 (e.g., lock on the door) is activated, (2) lighting or other devices within space 102 are activated, (3) a user device 170 associated with user 101 connects to a hotspot associated with space 102, (4) a sensor detects changes in ambient conditions (e.g., temperature, audio volume, etc.) within space 102, etc.

As shown in FIG. 5, process 500 may further include determining whether users 101 associated with reserving space 102 can reach space 102 at the designated time (block 530). Space management device 160 may determine an expected movement rate associated a user 101 and may determine whether user 101 is expected to arrive at space 102 based on the movement rate and a distance between the user's current location and the location of space 102. For example, a user 101 may walk at 1.5 meters/second. If a meeting in space 102 is scheduled to begin in 10 minutes (600 seconds), space management device 160 may determine that the user 101 is not expected to arrive at the meeting on time if user 101 is more than 900 meters (e.g., 1.5 m/sec.*600 sec.) from space 102. In another example, space management device 160 may identify a specify movement rate associated with user 101, such as to identify that user 101 walks at a different pace and/or that user 101 tends to take a break a certain location (e.g., to speak with a particular coworker). Space management device 160 may then determine whether user 101 is expected to arrive at space 102 based on the determined movement rate and the distance between the user's current location and the location of space 102.

If the user 101 is expected to arrive at space 102 before a scheduled time (block 530—Yes), space management device 160 may return to block 520 and may continue to monitor the location of user 101. Otherwise, if the user 101 is not expected to arrive at space 102 before the scheduled time (block 530—No), space management device 160 may reallocate space 102 (block 540). For example, space management device 160 may identify another user 101 that needs space 102 (e.g., the other user 101 has scheduled a meeting during the time period) and is located closer to space 102. Additionally, space management device 160 may identify another space 102 that is closer to user 101 and may assign the other, closer space to user 101.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 4 and 5, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   assigning, by a processor, a first geographic location reserved for a user during a time period, wherein assigning the first geographic location includes storing, in a database, data associating first configurable environmental controls with the user for activation by multiple Internet of things (IoT) devices at first specified levels for the first geographical location and for the time period;
   receiving, by a first detector, a first message transmitted by a device associated with the user, wherein the first detector automatically receives the first message when the device is within a first distance of the first detector;
   receiving, by the processor and from the first detector, a first indication that the device is within the first distance from the first detector;
   determining, by the processor and based on receiving the first indication, a second geographic location associated with the user;
   receiving, by a second detector, a second message transmitted by the device, wherein the second detector automatically receives the second message when the device is within a second distance of the second detector;
   receiving, by the processor and from the second detector, a second indication that the device is within the second distance from the second detector;
   determining, by the processor and based on receiving the second indication, a third geographic location associated with the user;
   identifying, by the processor, a movement pattern associated with the user based on the second geographic location and the third geographic location, wherein the movement pattern includes a movement direction and a movement rate associated with the user;
   predicting, by the processor and based on the movement pattern, a future location of the user at a start of the time period;
   determining, by the processor, whether the user is expected to arrive at the first geographic location by the start of the time period based on the future location; and
   reassigning, by the processor, the first geographic location to a different user during the time period based on an expectation that the user will not arrive at the first geographic location by the start of the time period, wherein reassigning the first geographic location includes activating, by the multiple IoT devices, second configurable environmental controls associated with the different user at second specified levels for the first geographical location and for the time period.

2. The method of claim 1, further comprising:
   calculating a distance that the user could move at the movement rate before the time period, and
   wherein at least one of the multiple IoT devices includes a locking mechanism configured to detect a presence message from a smart device associated with the different user.

3. The method of claim 1, further comprising:
   selecting, when the first geographic location is reassigned to the different user, a fourth geographic location from a plurality of geographic locations; and
   assigning the fourth geographic location to be used by the user during a second time period.

4. The method of claim 1, wherein assigning the first geographic location includes:
   identifying a number of participants scheduled to meet with the user during the time period; and
   selecting the first geographic location from a plurality of geographic locations based on the number of the participants scheduled to meet with the user.

5. The method of claim 1, wherein determining the second geographic location further includes:
   identifying, as the second geographic location associated with the user, based on a similarity of first environmental conditions detected by the device and second environmental conditions reported for a location of the first detector.

6. The method of claim 1, wherein a signal carrying the first message is received by the first detector, and wherein determining the second geographic location associated with the user further includes:
- identifying an attribute associated with the signal received by the first detector; and
- determining the second geographic location based on the attribute.

7. The method of claim 6, wherein determining the second geographic location based on the attribute includes:
- identifying a transmission signal strength for the device associated with the user;
- determining a received signal strength of a version of the signal received by the first detector; and
- determining the second geographic location based on a difference between the transmission signal strength and the received signal strength and a location of the first detector.

8. The method of claim 6, wherein the first detector includes an antenna that detects the first message in a direction, and wherein identifying the attribute associated with the signal includes:
- measuring, using the antenna, the attribute with respect to the direction.

9. A system comprising:
- a first detector configured to:
  - receive a first message transmitted by a device associated with a user, wherein the first detector is configured to automatically receive the first message when the device is within a first distance of the first detector;
- a second detector configured to:
  - receive a second message transmitted by the device, wherein the second detector is configured to automatically receive the second message when the device is within a second distance of the second detector;
- a memory to store instructions; and
- a processor configured to execute one or more of the instructions to:
  - initially assign a first geographic location reserved for a user during a time period by storing, in a database, data associating first configurable environmental controls with the user for activation by multiple Internet of things (IoT) devices at first specified levels for the first geographical location and for the time period;
  - receive, from the first detector, a first indication that the device is within the first distance from the first detector;
  - determine, based on receiving the first indication, a second geographic location associated with the user;
  - receive, from the second detector, a second indication that the device is within the second distance from the second detector;
  - determine, based on receiving the second indication, a third geographic location associated with the user;
  - identify a movement pattern associated with the user based on the second geographic location and the third geographic location, wherein the movement pattern includes a movement direction and a movement rate associated with the user;
  - predict, based on the movement pattern, a future location of the user at a start of the time period;
  - determine whether the user is expected to arrive at the first geographic location by the start of the time period based on the future location; and
  - reassign the first geographic location to a different user during the time period based on an expectation that the user will not arrive at the first geographic location by the start of the time period, wherein, when reassigning the first geographic location, the processor is further configured to execute one or more of the instructions to activate second configurable environmental controls associated with the different user at second specified levels for the first geographical location and for the time period.

10. The system of claim 9, wherein the processor is further configured to:
- calculate a distance that the user could move at the movement rate before the time period, and
- wherein at least one of the multiple IoT devices includes a locking mechanism configured to detect a presence message from a smart device associated with the different user.

11. The system of claim 9, wherein the processor is further configured to:
- select, when the first geographic location is reassigned to the different user, a fourth geographic location from a plurality of geographic locations; and
- assign the fourth geographic location to be used by the user during a second time period.

12. The system of claim 11, wherein the processor is further configured to:
- determine a route between the third geographic location and the fourth geographic location;
- generate a third message to the user, wherein the third message identifies the fourth geographic location and the route; and
- cause the third message to be forwarded to the user.

13. The system of claim 9, wherein the processor, when assigning the first geographic location, is further configured to:
- identify a number of participants scheduled to meet with the user during the time period; and
- select the first geographic location from a plurality of geographic locations based on the number of the participants scheduled to meet with the user.

14. The system of claim 13, wherein the processor, when reassigning the first geographic location, is further configured to:
- generate a third message to one or more of the participants, wherein the third message indicates that the first geographic location is no longer assigned to the user.

15. The system of claim 9, wherein the processor, when determining the second geographic location, is further configured to:
- determine the second geographic location based on a similarity of first environmental conditions detected by the device and second environmental conditions reported for a location of the first detector.

16. The system of claim 9, wherein the first message includes a Bluetooth connection request.

17. A non-transitory computer-readable medium configured to store instruction, the instructions comprising:
- one or more instructions that, when executed by a processor, cause the processor to:
  - initially assign a first geographic location reserved for a user during a time period by storing, in a database, data associating first configurable environmental controls with the user for activation by multiple Internet of things (IoT) devices at first specified levels for the first geographical location and for the time period;

receive, from a first detector, a first indication that a device associated with the user is within a first distance from the first detector, wherein the first detector automatically receives a first message from the device when the device is within a first distance from the first detector;

determine a second geographic location associated with the user based on the first indication;

receive, from a second detector, a second indication that the device is within a second distance from the second detector, wherein the second detector automatically receives a second message from the device when the device is within a second distance from the second detector;

determine a third geographic location associated with the user based on the second indication;

identify a movement pattern associated with the user based on the second geographic location and the third geographic location, wherein the movement pattern includes a movement direction and a movement rate associated with the user;

predict, based on the movement pattern, a future location of the user at a start of the time period;

determine whether the user is expected to arrive at the first geographic location by the start of the time period based on the future location; and reassign the first geographic location to a different user during the time period based on an expectation that the user will not arrive at the first geographic location by the start of the time period by activating second configurable environmental controls associated with the different user at second specified levels for the first geographical location and for the time period.

18. The non-transitory computer-readable medium of claim 17, wherein the one or more instructions further cause the processor to:

determine, based on the movement pattern, an expected path for the user before the time period; and predict the future location based on the expected path.

19. The non-transitory computer-readable medium of claim 17, wherein the one or more instructions further cause the processor to:

select, when the first geographic location is reassigned to the different user, a fourth geographic location from a plurality of geographic locations; and assign the fourth geographic location to be used by the user during a second time period.

20. The non-transitory computer-readable medium of claim 19, wherein the one or more instructions further cause the processor to:

determine a route between the third geographic location and the fourth geographic location;

generate a third message to the user, wherein the third message identifies the fourth geographic location and the route; and cause the third message to be forwarded to the user.

\* \* \* \* \*